Nov. 7, 1972     KLAS-ERIK JAKENBERG     3,702,268
SAW BLADE STEEL AND SAW-BLADES OR SAW-BLADE
STRIP MADE THEREFROM
Filed May 23, 1969

INVENTOR
KLAS-ERIK JAKENBERG,

BY Pierce, Scheffler & Parker his ATTORNEYS

United States Patent Office 3,702,268
Patented Nov. 7, 1972

3,702,268
SAW BLADE STEEL AND SAW BLADES OR SAW-BLADE STRIP MADE THEREFROM
Klas-Erik Jakenberg, Hagfors, Sweden, assignor to Uddeholms Aktiebolag, Hagfors, Sweden
Filed May 23, 1969, Ser. No. 827,279
Claims priority, application Sweden, May 31, 1968, 7,334/68
Int. Cl. C21d 7/00, 9/24
U.S. Cl. 148—12      15 Claims

ABSTRACT OF THE DISCLOSURE

There is provided a steel for making saw blades, and a saw blade made from the steel. The steel having an analysis of up to 20% Cr, 0.2–1.5% C, and a maximum of 6% additional alloying elements and being such that it has a ferrite matrix in the temperature range of 550–790° C., and in which range the steel in a ferritic state has been rolled to a total area reduction of at least 60%.

---

Figure 1:
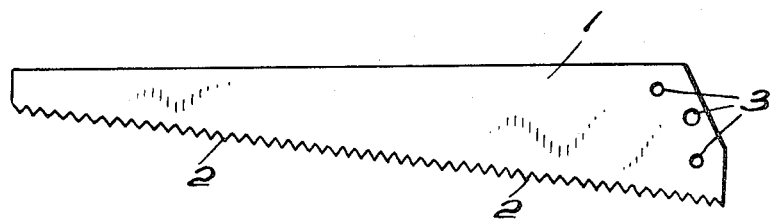

The present invention relates to a saw blade steel having good carbide solution ability, and a saw blade or saw-blade strip made therefrom. Steel for saw blades is one of the main products of cold rolling processes. Such steel is first hot rolled and then subjected to cold rolling in a number of passes through a cold rolling mill with intermediate soft anneals and recrystalization processes. When particularly concerning band saws, especially band saws intended for metal work, a material is desired which possesses a combination of properties whereby the saw teeth retain their sharpness, obtain a high degree of hardness, and are resistant to wear. The saw blade must be capable of withstanding a very large number of reciprocation bending movements. It must maintain teeth setting and straightness in spite of relatively high temperatures and temperature differences. Elasticity and tension must be good. The teeth must be capable of withstanding repeated impact stresses and strains of magnitude liable to cause fatigue.

The teeth must be capable of withstanding high impact load, even in cold conditions. The teeth must be able to withstand upsetting or swaging without fracturing, plastic to a certain extent. The saw blade must be capable of working smoothly and maintain a flat condition during sawing. These requirements, of which several imply opposite conditions, must be included with comfortable margins. An important advance in this direction has been made in the form of the tooth point hardening technic. According to this technic, only the outermost points of the saw teeth are hardened to a very high degree, while the remainder of the saw blade is either left unhardened, or is hardened to a much lower extent than the points of the teeth. One condition necessary to such a hardening process is that the steel has good carbide solution ability. It is known that this ability is impaired by the anneals rendered necessary by cold rolling, in which the particle size of the carbides rapidly increases at the temperatures in question. In order to decrease the growth rate of the carbides, the anneals have been effected at the lowest temperatures possible with regard to the recrystalization of the steel. In this way it has been possible to obtain acceptable results in favourable instances. The manufacturing process, however, comprises a large number of working steps and is lengthy and time consuming, with the result that the final product is expensive. Additionally, the annealing processes affect the material in an undesirable manner, since the material may obtain an uneven structure, which may result in a non-flat steel strip. Graphite is also liable to form in certain instances, which causes great difficulties. Furthermore, the risk of surface decarbonizing arises, and hence special precautionary measures must be taken.

The most essential object of the present invention is to change there conditions radically, whereby cold rolling is eliminated or reduced to one lesser final rolling operation, for the purpose of obtained specific, desired tolerances. The invention is mainly characterized in that the saw blade steel is a stripsteel having an analysis of up to 20% Cr, 0.2–1.5% C and a maximum total of 6% of other alloying substances, and which may have a ferritic matrix in a temperature range between 50 and 790° C., in which temperature range the material in ferritic state has been rolled to a total area reduction of at least 60%. By appropriately adapting starting structure, temperature and extent of reduction, the steel obtains a structure comprising finely divided carbides in a ferritic matrix with at least 40 and preferably at least 60 carbide particles per 100 $\mu m^2$.

Although the invention can be applied to all types of steel which fulfill the definition given above and which thus have a ferritic matrix in the given temperature range, it is primarily intended for low alloy steels normally used in the manufacture of saw blades, primarily blades for metal band saws. Consequently, high speed steel does not fall within the purview of the present invention. The starting structure of the steel prior to rolling within the given temperature range should be preferably a lamellar pearlitic structure. When working at the temperatures in question, it is possible to reduce the material to such an extent that the final, desired dimension can be obtained without intermediate operations in the form of anneals or other forms of heat treatment, and without overstraining the material. Cold rolling is normally unnecessary, but can of course be included, to obtain certain tolerances. The saw blade steel starting material prior to being worked suitably comprises a material which has been freed from oxides by pickling, blasting, grinding or like operations. In the case of unalloyed steel the rolling temperature lies between 550 and 720° C. The most expedient temperature has proved to be 700° C. In spite of this relatively high temperature bright surfaces are obtained directly when rolling. Stainless steel is best worked at temperatures between 690–790° C., preferably at about 750° C.

The saw blade steel of the present invention has particularly good carbide solution properties, and a very homogeneous structure. It is therefore well suited for tooth point hardening; a process which has previously been accompanied by serious difficulties in that a transition zone is formed between saw tooth and the web of the saw which has poor resistance to fatigue fractures. When using a saw blade steel produced according to the invention, the point of the saw tooth can be hardened very rapidly, whereby a shorter transition zone is obtained, and subsequently less risk of failure as a result of fatique. Furthermore, setting of the teeth of all types of saw is greatly facilitated with a saw blade steel made in accordance with the invention. The homogeneous structure of the saw blade steel also results in a smooth and flat saw blade, which is an important factor in the functioning of the saw.

A number of examples will now be given, showing the application of the present invention.

EXAMPLE 1

Metal bandsaw steel

The following steels, manufactured by Uddeholms Aktiebolag, can be mentioned as suitable steels for metal bandsaws.

| | Percent | | | |
|---|---|---|---|---|
| | C | Si | Cr | W |
| Steel: | | | | |
| UHB 26C | 1.30 | 0.20 | 0.20 | |
| UHB ANKAR | 0.70 | 1.70 | 0.20 | |
| UHB 24CW15 | 1.20 | 0.25 | 0.20 | 1.40 |

The steel preferably used in UHB 26C. The starting material, which comprises hot rolled strip cooled to room temperature, is so treated that it presents a lamellar pearlite with a cementite surplus structure. In accordance with invention the steel can normally be worked direct with this structure without prior annealing being necessary, and can be reduced to unlimited dimensions, by which is meant that the material can be reduced to the final, desired dimension without applying special intermediate annealing or recrystalization annealing processes. Suitable rolling temperatures are those lying in the range of 550–720° C., a temperature above 600° C. being preferred. A suitable standard magnitude is 700° C.

During rolling the lamellar peralite is transformed to a very finely divided, spheroidized carbide phase. This transformation is drastically accelerated by the mechanical work to which the material is subjected. By suitably combining primarily temperature and the extent to which the material is reduced it is possible to obtain a final structure which comprises finely divided carbides in a ferrite matrix having at least 40 and, without great difficulty, even more than 60 carbide particles per 100 $\mu m.^2$. A carbide distribution of more than 70 carbide particles per 100 $\mu m.^2$ has been obtained in some cases. The material must be worked to a total area reduction of at least 70% at the aforesaid temperature of 700° C. The material should be worked, however, to a total area reduction of at least 85%. Of the parameters temperature, extent of working, deformation rate and heating time, temperature and deformation rate area these factors which influence the spheroidizing sequence most. The heating time only affects the spheroidizing sequence to a slight extent, where as the influence of the deformation rate is purely marginal.

When rolling, the material can be reduced down to the final, desired dimension in just a few passes through the rolls. Subsequent to optional adjustment at room temperature, the steel is then ready for use, as metal working bandsaw blades. When manufacturing the saw blades, the teeth are punched or cut in a known manner. Since when proceeding in accordance with the present invention a high yield point/ultimate strength ratio is obtained the task of punching out the teeth is greatly facilitated. As a result of the high carbide density and the fine spheroidization, the solubilizing ability of the steel is very good, and the steel is well suited for saw teeth hardening, which can be affected in accordance with conventional methods. Furthermore, because the steel is not subjected to repeated heating and cooling processes in connection with cold rolling, it is also very smooth and flat, this also being assured by the homogeneous structure of the steel.

Bandsaw blades manufactured from a material produced in the manner aforedescribed are resistant to fatique, smooth and flat, possess a high yield point/ultimate strength ratio and despite the qualitative services are less expensive to produce than saw blades produced solely by cold rolling processes.

The steels UHB ANKAR and UHB 24CW15 are also treated substantially in the manner aforedescribed.

EXAMPLE 2

Steel for bandsaw blades intended for cutting meat

UHB Ankar steel can be used for saw blades intended for cutting meat. It is also possible to use a stainless steel for this special purpose, which from the point of view of hygiene is to be preferred. A steel which has been used in this connection is UHB Stainless 31, made by Uddeholms AB and having the type analysis 0.22% C, 13.6% Cr, 0.5% Ni. This material is rolled within the temperature range of 700–790° C., suitable at about 750° C. As in the previous example, the factors temperature and the extent to which the material is reduced are so adapted in relation to each other that a well spheroidized structure is obtained, having at least 40–60 carbide particles per 100 $\mu m.^2$.

The area reduction at the preferred temperature of 750° C. should reach at least 70%, and preferably more than 80%. In order to obtain the best results, the total area reduction should be in excess of 85%. For this special purpose, sawing meat, a cold rolling operation at room temperature is preferably undertaken. A strip steel of this category can be hardened in its entirety. However, it may be necessary to harden the teeth of the blade in this instance also.

The invention is naturally not restricted to saw blade steel for bandsaws, although its greatest use lies within this field. As previously mentioned, saw blades intended for sawing meat can also be produced from the steel of the present invention. Steel for other types of sawblades may also be produced while utilizing the advantages of the invention, such as for instance steel for woodsaws, stone saws and motor driven chain saws. The saw blades produced in accordance with the invention may be of any shape, such as band saws, circular saws, bow-saws, key-hole or compass saws, handsaws and articulated blades for chain saws. The starting material used is suitable material having the standard saw blade steel qualities presented in the pamphlet "Uddeholms cold-rolled saw blade steel" (Uddeholms kallvalsade sågstål, UHB printed matter 601105) issued by Uddeholms AB. Steel not possessing anti-rust properties shall be treated in the manner specified in Example 1, while stainless steel is treated as specified in Example 2.

The invention can of course be varied with the purview of the inventive spirit. The aforesaid steel compositions should only be observed as conceivable types of analysis which can be used in accordance with the invention. Thus, minor quantities of different alloying constituents are fully conceivable. Accordingly, non-stainless steel can be given different alloying elements up to a maximum total content of 7%. The carbon content of non-stainless steel should be greater than 0.4%, and stainless steel, which should also have a ferrite matrix with carbides of different form within the given temperature range, should preferably have a carbon content of more than 0.2% and different elements normally present in stainless steel. In accordance with the invention it is possible to advantage to use material containing substances which favour the occurrence of graphite, e.g. silicon, nickel or aluminium, i.e. material, which when applying conventional techniques, create great difficulties in connection with cold working and annealing processes. Such a material for instance is the aforementioned UHB 24CW15. It is also possible by adding the deoxidation agents aluminium and silicon in quantities of up to 0.1% and 2% respectively, to obtain a steel which forms less slag, from steel which tends to form graphite when subjected to conventional treatment processes.

Figure 2:
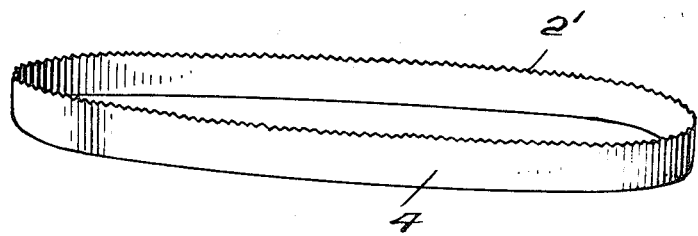

The invention is further disclosed by reference to the accompanying drawing, in which:

FIG. 1 is a side view of a saw blade for a hand saw, a handle therefore having been omitted; and FIG. 2 is a perspective view of a saw blade strip for a band saw.

In FIG. 1, the saw blade per se is represented at 1, while the saw teeth—which in this case have been hardened in conventional manner— are represented at 2. At its broader end, blade 1 is provided with conventional openings, 3, 3, for securing to the blade a handle conventional for a hand saw.

In FIG. 2, the band saw blade 4 is provided with appropriate teeth 2', 2; which may be conventionally hardened as occasion warrants.

What is claimed is:

1. A saw blade steel, characterized in that it consists of a steel strip having up to 20% Cr, 0.2–1.5% C. and a maximum total of 6% additional alloying substances, and which has a ferrite matrix in a temperature range of between 550–790° C., in which range the material in ferritic state has been rolled to a total area reduction of at least 60%.

2. The steel strip of claim 1 characterized in that said steel has been rolled in said temperature range to a total area reduction of at least 70%.

3. The steel strip of claim 1, characterized in that it has a structure which consists of finely divided carbides in a ferritic matrix with at least 40 carbide particles per 100 $\mu m.^2$.

4. The steel strip of claim 1, characterized in that it is of the carbon steel type and has been rolled in the temperature of about 700° C.

5. The steel strip of claim 4, characterized in that it contains 0.4–1.5% C. and a maximum total of remaining alloying substances of 7%.

6. The steel strip of claim 1, characterized in that the steel is a stainless steel and that it has been worked in the temperature range of between 690–790° C.

7. The steel strip of claim 6, characterized in that it contains 0.2–1.5% C., 11–20% Cr and a maximum total of 7% remaining alloying substances.

8. The strip defined in claim 1, characterized in that it is in the form of a toothed saw blade.

9. The saw blade strip of claim 8, characterized in that the points of the teeth thereof have been hardened.

10. A method for the production of a steel strip according to claim 1, characterized in that a strip steel having up to 20% Cr, 0.2–1.5% C. and a maximum total of 6% additional alloying substances, is rolled in the temperature range of between 550°–790° C., the strip steel being subjected to a total area reduction of at least 60%, at the same time as the starting structure; the temperature; and the extent of reduction is so chosen that the steel obtains a structure consisting of finally divided carbides in a ferritic matrix with at least 40 carbide particles per 100 mm.$^2$.

11. A method according to claim 10, characterized in that the strip steel is rolled in the said temperature range with at least 70% total area reduction.

12. A method, according to claim 10 for the production of steel strip of the carbon steel type, containing 0.4–1.5% carbon and a maximum total of 7% of additional alloying substances, characterized in that the strip steel is rolled in the temperature range 550–720° C.

13. A method for the production of stainless steel strip according to claim 1 the steel containing 0.2–1.5% C; 11–20% Cr and a maximum total of 6% of additional alloying substances, characterized in that the strip steel is rolled in the temperature range 690°–790° C.

14. A method according to claim 10 characterized in that the starting material after hot rolling and cooling is heated to, and rolled in, a ferritic state in the said temperature range without any foregoing annealing operation.

15. A method according to claim 14 characterized in that as a starting material there is chosen a strip steel having a substantially lamellar pearlitic structure.

References Cited

UNITED STATES PATENTS

| | | | |
|---|---|---|---|
| 2,801,916 | 8/1957 | Harris et al. | 148—12 |
| 2,905,577 | 9/1959 | Harris et al. | 148—12 |
| 3,116,180 | 12/1963 | Malzacher | 148—12.4 |
| 3,216,868 | 11/1965 | Nachtman | 148—12 |
| 3,281,287 | 10/1966 | Edström et al. | 148—12.4 |
| 3,425,877 | 2/1969 | Deacon | 148—12.4 |

WAYLAND W. STALLARD, Primary Examiner

U.S. Cl. X.R.

148—36, 37